United States Patent
Srinivas et al.

(10) Patent No.: US 12,361,366 B1
(45) Date of Patent: Jul. 15, 2025

(54) ARTIFICIAL INTELLIGENCE MODELS FOR VERIFICATION OF PACKAGING REMOVED DELIVERIES

(71) Applicant: Amazon Technologies, Inc., Seattle, WA (US)

(72) Inventors: Badrinath Gurappa Srinivas, Bellevue, WA (US); Karthik Ram Srinivasan, Bellevue, WA (US); Brian Michael Rock, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 152 days.

(21) Appl. No.: 17/943,633

(22) Filed: Sep. 13, 2022

(51) Int. Cl.
  *G06Q 10/083* (2024.01)
  *G06N 20/20* (2019.01)
  *G06V 10/40* (2022.01)
  *G06T 19/00* (2011.01)

(52) U.S. Cl.
  CPC .......... *G06Q 10/083* (2013.01); *G06N 20/20* (2019.01); *G06T 19/006* (2013.01); *G06V 10/40* (2022.01)

(58) Field of Classification Search
  CPC ............ G06Q 10/08–083; G06N 20/20; G06T 19/006; G06V 10/40
  See application file for complete search history.

(56) References Cited

U.S. PATENT DOCUMENTS

| | | | | |
|---|---|---|---|---|
| 7,528,722 | B2 * | 5/2009 | Nelson | G06Q 10/08 340/568.1 |
| 10,262,290 | B1 * | 4/2019 | Mossoba | G06V 10/7715 |
| 10,388,092 | B1 * | 8/2019 | Solh | G07C 9/37 |
| 10,627,244 | B1 * | 4/2020 | Lauka | G01C 21/3623 |
| 10,937,169 | B2 * | 3/2021 | Dharur | G06N 3/084 |
| 2019/0012639 | A1 * | 1/2019 | Boothman | G06Q 10/0838 |
| 2019/0043004 | A1 * | 2/2019 | Lesieur | G02B 27/0176 |
| 2019/0347612 | A1 * | 11/2019 | Anders | G01S 19/42 |
| 2019/0354919 | A1 * | 11/2019 | Mahboob | G06F 16/2468 |
| 2020/0193609 | A1 * | 6/2020 | Dharur | G06T 7/143 |
| 2022/0398750 | A1 * | 12/2022 | Kerzner | G06V 10/62 |
| 2023/0161351 | A1 * | 5/2023 | Prasad | G06Q 10/087 701/28 |
| 2023/0376884 | A1 * | 11/2023 | Lerner | G06V 10/56 |
| 2024/0071078 | A1 * | 2/2024 | Carder | G06Q 10/0833 |

OTHER PUBLICATIONS

Brems, "Using Computer Vision to Detect Package Deliveries" (Jan. 19, 2021), (<https://web.archive.org/web/20210307113634/https://blog.roboflow.com/using-computer-vision-to-detect-package-deliveries/> captured using Wayback Machine on Mar. 7, 2021). (Year: 2021).*

* cited by examiner

*Primary Examiner* — Jeff Zimmerman
*Assistant Examiner* — Brian A Tallman
(74) *Attorney, Agent, or Firm* — Kilpatrick Townsend & Stockton LLP

(57) ABSTRACT

Artificial intelligence (AI) models for verifying packing removed deliveries are described herein. In an example, a computer system receives image data corresponding to a portion of a delivery location. The computer system determines an indication of at least one delivery object in the portion. The computer system inputs the indication into a first AI model trained for detecting entity-associated packaging associated with the at least one delivery object. The computer system receives, from the first AI model, an output of whether the at least one delivery object includes the entity-associated packaging. The computer system causes a first presentation about the output to be provided at a device.

20 Claims, 9 Drawing Sheets

ARTIFICIAL INTELLIGENCE MODELS FOR VERIFICATION OF PACKAGING REMOVED DELIVERIES

BACKGROUND

Different computing services are available to improve user experience with item deliveries. For instance, a driver can receive a map of the delivery location on their device. Also, the driver can take an image of an item that is dropped off at a delivery location. The image taken by the driver can also be sent to a device of a user that is associated with the delivery location.

BRIEF DESCRIPTION OF THE DRAWINGS

Various embodiments in accordance with the present disclosure will be described with reference to the drawings, in which.

DETAILED DESCRIPTION

Figure 1:
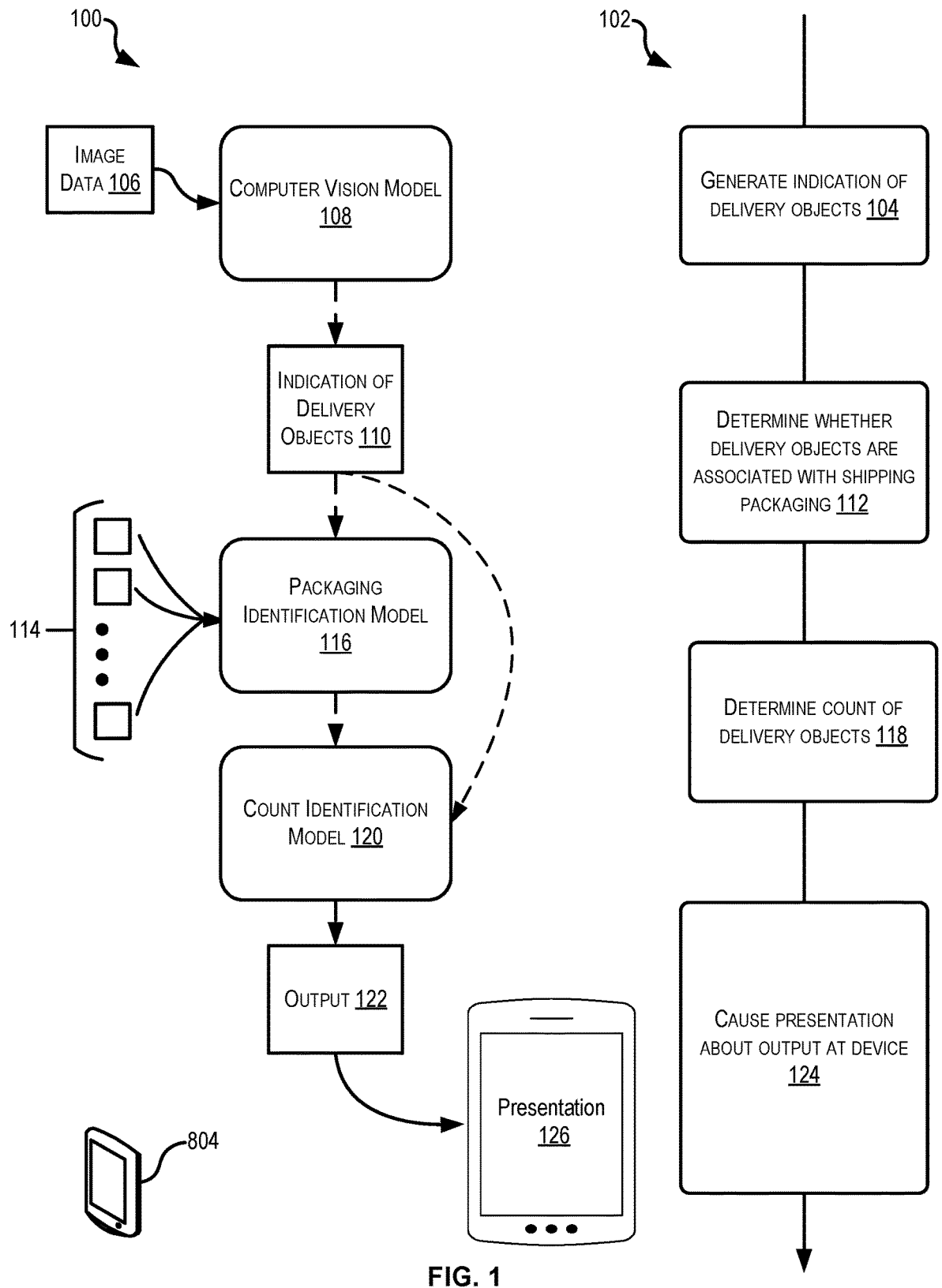
FIG. 1 illustrates an example block diagram and associated flowchart showing a process for implementing techniques relating to using artificial intelligence models to verify deliveries, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques to improve image processing related to item deliveries. A customer may access an online marketplace to purchase items that can be delivered to them via a shipping entity associated with the online marketplace. When items are delivered by a delivery agent, the delivery agent may take an image of the items, which can be processed for various reasons. For instance, image processing may be used to verify delivery of the items at the delivery location, verify a correct placement of the items at the delivery location, or to provide additional information about the delivery of the items. Some existing techniques require communication with a server, which can be slow and bandwidth intensive, but embodiments of the present disclosure can run on a user device, implement multiple artificial intelligence (AI) models on the user device, and make a determination in real-time.

In an example, a computer system such as a user device may receive image data showing a portion of a delivery location. The user device determines whether the portion includes delivery objects with entity-associated packaging using various AI models. A first AI model can be a computer vision model that receives the image data and generates an indication of delivery objects at the delivery location. Then, a second AI model associated with object classification, such as a binary classifier, receives the output of the computer vision model and determines whether entity-associated packaging is detected. Based on the detection of entity associated packaging or not, a third AI model associated with determining a count of delivery objects may be triggered. For instance, if the entity-associated packaging is not detected, the third AI model may receive the indication of delivery objects and output a number of delivery objects in the portion of the delivery location. The user device causes a presentation based on the indication from the second AI model and/or the third AI model to be provided at an output component of the user device, such as in an overlay over the image data on a display of the user device. For example, if the output of the second AI model indicates that the portion includes delivery objects with the entity-associated packaging, the presentation may be a notification that the delivery is incorrect. Additionally, if the output of the third AI model indicates that the portion includes a count of delivery objects that does not match a number of delivery objects in a manifest that are to be delivered at the delivery location, the presentation may be a notification that the delivery is incorrect. Or, if the indication indicates that the portion does not include delivery objects with the entity-associated packaging, the presentation may be a notification that the delivery is correct.

To illustrate, consider an example of a delivery agent delivering items along a route. For instance, the delivery agent may be delivering four items to a residential address (e.g., a delivery location). The delivery agent may have received a delivery instruction previously, or in connection with the delivery, that at least some of the four items will require removal from shipping packaging (e.g., unpackaging from shipping packaging). A user device of the delivery agent may be used to check the accuracy of the delivery, e.g., as it relates to execution of the delivery instructions. During delivery of the items at the residential address (e.g., after placing the four items on a doorstep of a house at the address), the delivery agent may use the user device to interact with the four items. For example, the delivery agent may receive additional instructions about delivery (e.g., a placement location instruction, a delivery instruction, etc.), scan barcodes on the items, capture images of the items, and the like. An image of the items at the delivery location (e.g., corresponding image data of the image) captured by the user device may be input into a computer vision model running on the user device. The computer vision model may predict whether objects in the image are delivery items (e.g., parcels, envelopes, boxes, etc.). In this example, the computer vision model may predict whether the four objects on the doorstep are four delivery items. Output from the computer vision model is then input into a first AI model running on the user device. The first AI model may be trained for predicting whether items in an image include entity-associated packaging. For example, once the computer vision model has determined that the objects are delivery items, the first AI model may predict whether any of the four items include indicia of packaging (e.g., entity logos, tape lines, recognizable markings associated with packaging, etc.), which may be associated with a particular entity. Upon the first AI model determining that the four items include indicia of packaging associated with the particular entity, and have therefore not been unpacked from the shipping packaging, the user device can generate a notification relating to the delivery. The user device may present the notification at the user device in a way that quickly grabs the delivery agent's attention (e.g., as an overlay on the image). If the first AI model determines that the four items do not include indicia of packaging associated with the particular entity, the user device can generate an indication that the delivery instruction has been fulfilled. This indication can be input into a second AI model running on the user device. The second AI model may be trained for determining a count of objects in the image data. The determined count can be compared to a manifest of items that are to be delivered at the residential address. If there is a mismatch between the count and the manifest (e.g., the count is three items and the manifest indicates the four items), the user device can present a notification of an incorrect delivery. If the count matches the manifest, the device can present a notification of a correct delivery.

Embodiments of the present disclosure provide various technological advantages over a conventional computer system. For example, conventional techniques may involve a user device uploading delivery images or streaming video to a server that runs AI models to process the delivery images or video. Feedback regarding the delivery images or video may then be communicated back to the user device from the server. As such, the communication between the user device and the server can require significant network bandwidth. In comparison, the embodiments provide the user device that runs less computationally intensive versions of the AI models without communication with a server. So, the embodiments provide conservation of network bandwidth.

In addition, conventional user interfaces for delivery agents may involve navigation through multiple pages to find relevant information for an item delivery. As such, the time of delivery may be increased as the delivery agent attempts to locate the needed information. In contrast, the embodiments provide an improved user interface that quickly provides only the necessary information (e.g., actions to be performed, notifications about delivery, etc.) for an item delivery without requiring additional click throughs, page views, etc. Additionally, the user interface can provide real-time feedback to the delivery agent about the delivery. For instance, upon a determination that there is an error with the delivery (e.g., shipping packaging is detected and should be removed, a number of items detected doesn't match a manifest of items to be delivered, etc.), the user interface can display a notification about the error in real time. That is, the notification can be displayed in a same viewing are as an item image while the item image is simultaneously displayed.

A conventional computer system may use AI models to make determinations about item deliveries, but in the case of object detection, these AI models may not accurately identify objects. To address this issue, the embodiments provide AI models trained on images of various items of different, shapes, sizes, colors, etc. so that the AI models learn to accurately detect features of interest. For example, a packaging detection model that is trained to detect shipping packaging is trained using images that include the shipping packaging and images that do not include the shipping packaging. The images include items of irregular shapes (e.g., scissors, soccer ball, etc.) for improved accuracy of the packaging detection model. This combination of images provides a robust packaging detection model that can accurately detect a wide range of items.

Conventional computer systems may receive and process images of a delivery after the delivery has been performed (e.g., after a delivery agent has left the delivery location). But, if it is determined that the delivery is incorrect, additional resources (e.g., computer processing or delivery agent deployment) may be needed to perform a corrective action. The embodiments provide multiple computing services, some of which can be implemented in real-time, by processing image data. During the delivery, the device receives real-time feedback of a correct delivery at the delivery location. Accordingly, the amount of incorrectly delivered items are reduced. In case of an incorrect delivery, a cause is identified such that a corrective action can be taken immediately. As a result, the amount of processing and resources to correct incorrectly delivered items are reduced.

Turning now to the figures, FIG. 1 illustrates an example block diagram 100 and associated flowchart showing a process 102 for implementing techniques relating to AI models for verification of packaging removed deliveries, according to at least one example.

The diagram 100 depicts devices, objects, and the like that correspond to the process 102. The process 102 can be performed by any suitable combination of hardware and/or software, as described herein.

Figure 2:
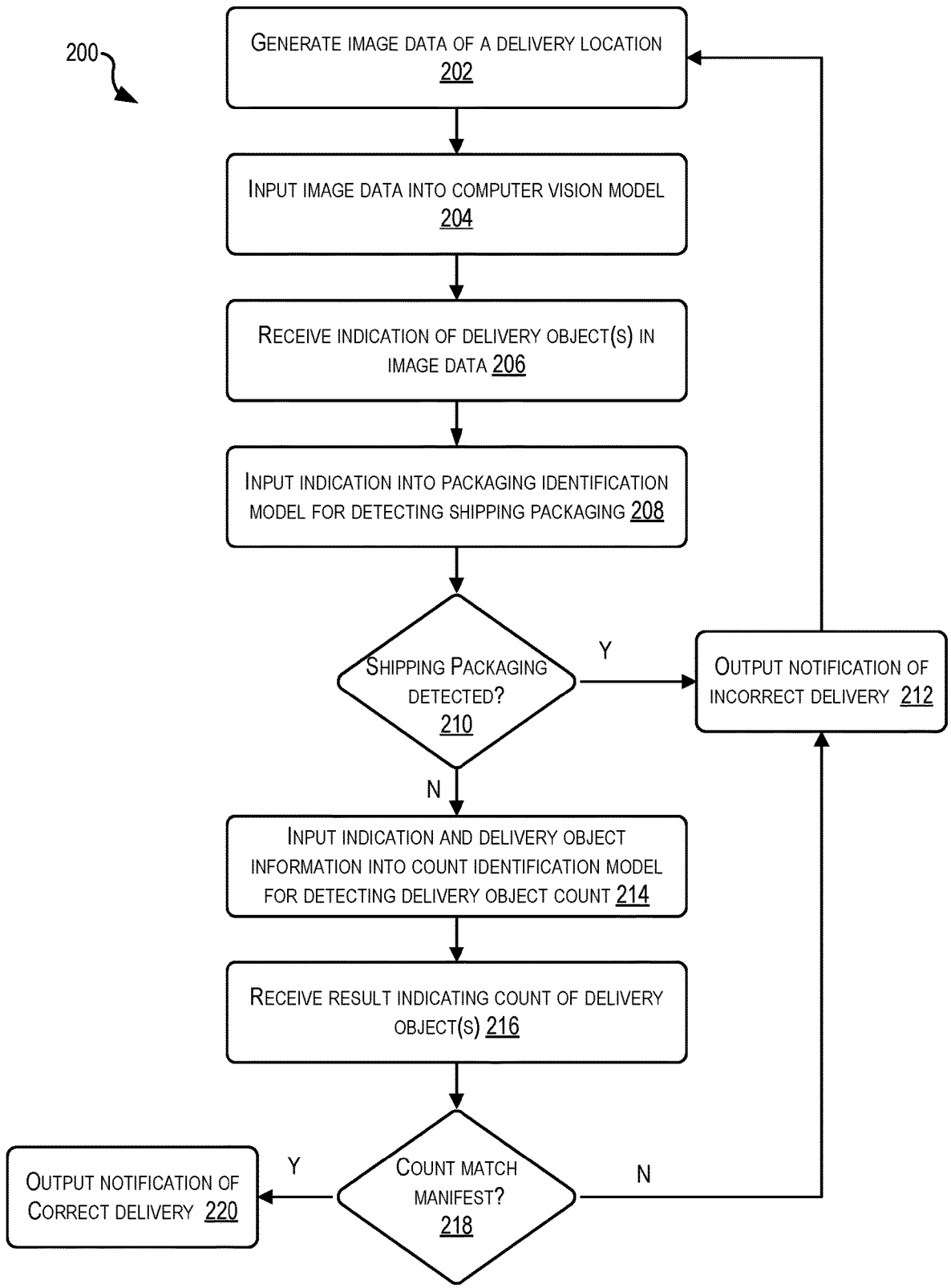
FIG. 2 illustrates an example flowchart showing a process of using artificial intelligence models to verify deliveries, according to at least one example.
Figure 7:
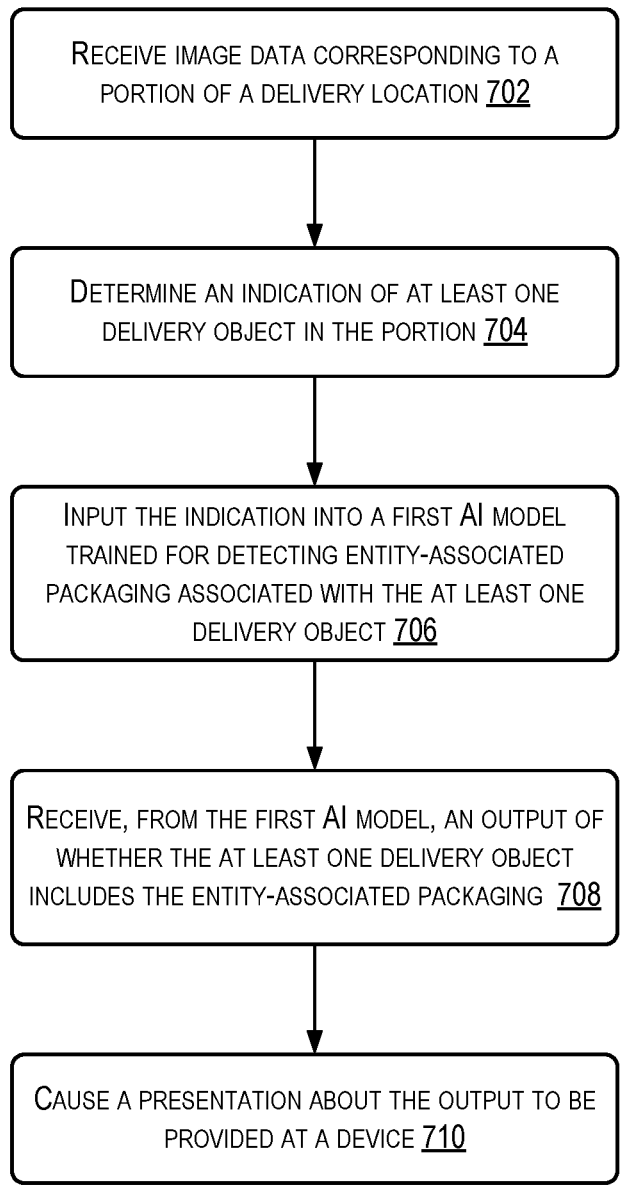
FIG. 7 illustrates an example flowchart showing a process for implementing techniques relating to verifying deliveries using artificial intelligence models, according to at least one example.

FIGS. 1, 2, and 7 illustrate example flow diagrams showing respective processes 102, 200, and 700, as described herein. The processes 102, 200, and 700, are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

A delivery verification engine 810 (FIG. 8) embodied in a computer system 802 (FIG. 8) and/or within a user device 804 (FIG. 8) may perform the process 102. Thus, while the description below is from the perspective of the user device 804, the computer system 802 may also perform the process 102 or portions of the process 102.

The process 102 may begin at block 104 by the user device 804 generating an indication of delivery objects 110. The indication of delivery objects 110 can be a list of objects predicted to be represented in image data 106. Each object may additionally be associated with a probability of the object being present in the image data 106. The image data 106 can be generated by a camera of the user device 804 during a delivery of one or more items at a delivery location. The image data 106 can be input to a computer vision model 108 trained for detecting delivery objects in images. Delivery objects can include shipping packaging or non-shipping packaging (e.g., items removed from shipping packaging or other entity-associated packaging). The computer vision model 108 may be an AI model, such as a fast region-based convolutional network (FRCNN) and single-shot detector (SSD), which are computationally efficient to be run on the user device 804 with sub-second latency. The computer vision model 108 can receive the image data 106 and output the indication of delivery objects 110.

The process 102 may continue at block 112 by the user device 804 determining whether delivery objects are associated with shipping packaging. While items are transported to delivery locations, they may be packaged within packaging (e.g., boxes, mailers, etc.) that is associated with an entity. In some examples, such packaging may be referred to as entity-associated packaging or shipping packaging. The entity may be a shipping entity with which a delivery agent is associated (e.g., employed by, contracted with, etc.), an entity that operates a store from which the items were purchased, and the like. Some delivery locations may be associated with certain actions that the delivery agent can be instructed to perform. An example action may be to remove the shipping packaging, remove certain packaging, add certain packaging (e.g., a rain bag), stow in customer delivery box, etc. The action can be determined by the entity based on instructions from a user (e.g., a user associated with a delivery location may access a user account and indicate that shipping packaging is to be removed prior to delivery of items at their delivery location), based on location (e.g., an apartment building can be associated with not removing shipping packaging), based on current weather (e.g., add a rain bag over the delivered objects if it is raining during delivery, or not remove the packaging in inclement weather), based on laws and regulations in the area (e.g., safety regulations may require that certain items remain in shipping packaging), based on item type (e.g., add protective packaging if item is fragile), based on a value of the item (e.g., do not remove shipping packaging if the value is above a certain threshold), etc.

To determine whether the delivery objects are associated with shipping packaging, the user device 804 can access a packaging identification model 116. The packaging identification model 116 may be configured to detect the shipping packaging in image data generated during a delivery of items. The packaging identification model 116 may be any suitable classification model such as an extreme gradient boosting (XGBoost) model, a convolutional neural network (CNN), a random forest, or other suitable AI model trained to perform the functions described with respect to the packaging identification model 116. As an example, the XGBoost model may be computationally efficient for deployment on the user device 804. The packaging identification model 116 can be trained using training images 114. The training images 114 can include images that show various shipping packaging and images that show non-shipping packaging. The images showing shipping packaging may include boxes, envelopes, or any other suitable types of packaging (e.g., bubble-lined mailers, etc.). The images showing shipping packaging may be sourced from a library of images showing the shipping packaging. The images that show non-shipping packaging may include images of items that are not packaged within the shipping packaging and images of packaging associated with other entities. So, the packaging identification model 116 can learn features associated with the shipping packaging, such as a logo of the entity that is included on the shipping packaging, textures of the different types of shipping packaging, barcodes included on shipping packaging, and attributes of tape used by the entity in their shipping packaging. The packaging identification model 116 may additionally be trained based on the delivery agent's performance history of shipping packaging removal. As such, the packaging identification model 116 can be trained to detect the features and predict whether an image of a delivery of items includes the shipping packaging.

Once trained, the indication of delivery objects 110 can be input to the packaging identification model 116, and the packaging identification model 116 can generate an output that indicates whether the delivery objects are associated with the shipping packaging. The output may be a probability that the delivery objects include shipping packaging. Based on the probability, a binary result of whether shipping packaging is detected or not may be determined. For instance, the probability may be compared to a threshold (e.g., 0.5) and if the probability exceeds the threshold the delivery objects can be determined to include the shipping packaging. Otherwise, if the probability is below the threshold, the delivery objects can be determined to not include the shipping packaging.

The process 102 may continue at block 118 by the user device 804 determining a count of delivery objects. The indication of delivery objects 110 and other information (e.g., a manifest of items to be delivered at the delivery location, dimensional information about the delivery objects, geometrical locations of the delivery objects, etc.) can be input into a count identification model 120 trained for determining counts of delivery objects. The count identification model 120 may be any suitable object detection AI model, such as a mask RCNN model, a you only look once (YOLO) model, or an SSD model. In an example, the mask RCNN model may be more precise for segmenting the mask region. Based on the indication of delivery objects 110 and the other information, the count identification model 120 can output a count of delivery objects in the image data 106. For instance, the count may indicate that there are predicted to be three objects in the image data 106. The count can also be associated with a probability that the predicted number of objects are present in the image data 106.

Based on the outputs of the packaging identification model 116 and the count identification model 120, the user device 804 can generate an output 122. The output 122 can include an indication of whether shipping packaging is detected and an indication of the count of delivery objects in the image data 106. The user device 804 may determine whether there is a match between the count and a number of items included in the manifest of the delivery and additionally include an indication of the match or mismatch in the output 122. In addition, if the user device 804 determines there is a mismatch between the count and the number of items in the manifest, the user device 804 may determine which items in the manifest are missing. For example, the computer vision model 108, the packaging identification model 116, the count identification model 120, or another AI model may be trained to identify the delivery objects in the image data 106. The identification may be based on the packaging of the delivery object, a barcode detected for a delivery object, and/or other features of the delivery objects in the image data 106. Using the generated identification, the items in the manifest can be compared to the identified items to determine which item(s) are missing.

The process 102 may continue at block 124 by the user device 804 causing a presentation 126 about the output 122 at the user device 804. If the output 122 indicates that at least one delivery object is associated with the shipping packaging and/or a mismatch between the count and the manifest, the presentation 126 may include a notification that the delivery is incorrect and that the shipping packaging should be removed and/or the number of delivered objects is to be verified for a correct delivery. The presentation 126 may additionally indicate which item(s) are missing. If the output 122 indicates that the delivery objects are not associated with the shipping packaging (e.g., the shipping packaging has been removed) and/or the count matches the manifest, the presentation 126 may include an indication that the delivery is correct. The real-time verification of packaging removal during the delivery can ensure that items are delivered as desired to customers.

FIG. 2 illustrates an example flowchart showing a process 200 of using AI models to verify deliveries, according to at least one example. The delivery verification engine 810 (FIG. 8) embodied in the computer system 802 (FIG. 8) and/or the user device 804 (FIG. 8) may perform the process 200. Thus, while the description below is from the perspective of the user device 804, the computer system 802 may also perform the process 200 or portions of the process 200.

The process 200 may begin at block 202 by the user device 804 generating image data (e.g., image data 106 in FIG. 1) of a delivery location. A camera of the user device 804 can be used to generate the image data of at least a portion of the delivery location. For instance, the portion of the delivery location can be an area in which a delivery agent using the user device 804 has placed delivery objects at the delivery location. A depth sensor of the user device 804 may additionally be used to generate dimensional information of the portion of the delivery location. The user device 804 may perform a lookup of user account information associated with the delivery location to determine whether the delivery location is associated with a delivery-object action, such as a shipping packaging removal operation, a protective covering addition operation, a stowing operation, etc. If the delivery location is associated with the shipping packaging removal operation, shipping packaging is to be removed from items prior to the items being delivered at the delivery location. Otherwise, the items are to remain in the shipping packaging for the delivery. Upon determining that the delivery location is associated with the shipping packaging removal operation (or another delivery-object action), the user device 804 may output a notification of the shipping packaging removal operation (or the other delivery-object action). The notification may be presented at the user device 804 to indicate to the delivery agent that they are to remove the shipping packaging prior to delivery. Additionally or alternatively, the notification may be provided to the delivery verification engine 810 for use in determining correct deliveries and incorrect deliveries.

The process 200 may continue at block 204 by the user device 804 inputting the image data into a computer vision model (e.g., computer vision model 108 in FIG. 1). The computer vision model can be configured to detect delivery objects (e.g., packaged or unpackaged items) in images. If a depth sensor generated dimensional information, the dimensional information can also be input into the computer vision model.

The process 200 may continue at block 206 by the user device 804 receiving an indication of delivery objects (e.g., indication of delivery objects 110 in FIG. 1) in the image data 106. The computer vision model can output the indication of delivery objects, which can include a list of delivery object(s) in the image data and a probability of the image data including the delivery object(s) for each delivery object of the delivery object(s). For instance, the indication of delivery objects may indicate that the image data includes a first delivery object with a probability of 80% and a second delivery object with a probability of 65%.

The process 200 may continue at block 208 by the user device 804 inputting the indication of delivery objects into a packaging identification model (e.g., packaging identification model 116 in FIG. 1) for detecting shipping packaging. The packaging identification model can be trained using images that show shipping packaging and images that show non-shipping packaging. The packaging identification model generate an output about whether the delivery objects in the image data include shipping packaging. The output may be a binary result (e.g., based on thresholding) of the shipping packaging being detected or the shipping packaging not being detected. The determination may be on an object-by-object basis or for the overall image data. So, the packaging identification model may output an indication of whether each delivery object in the indication of delivery objects is predicted to include shipping packaging or not. In this way, actions (e.g., packaging removal, packaging addition, etc.) associated with individual objects can be determined.

The process 200 may continue at block 210 by the user device 804 determining whether shipping packaging is detected. The user device 804 can determine whether the shipping packaging is detected based on the output of the packaging identification model. If the output indicates that shipping packaging is detected, the process 200 can proceed at block 214. Otherwise, the process 200 proceeds at block 212.

The process 200 may continue at block 212 by the user device 804 outputting a notification of an incorrect delivery. Since the delivery location is associated with the shipping packaging removal operation and the shipping packaging is detected by the packaging identification model, the user device 804 determines the delivery is an incorrect delivery (e.g., shipping packaging has not been removed for one or more items). So, the user device 804 outputs the notification on a display of the user device 804. The notification may be displayed in real time to the image data being generated and may indicate that shipping packaging is to be removed and then additional image data is to be generated at the delivery location before the delivery is considered a correct delivery. So, the delivery agent may perform the corrective action of removing the shipping packaging and then the process 200 can return to block 202 by the user device 804 generating updated image data of the delivery location.

The process 200 may continue at block 214 by the user device 804 inputting the indication and delivery object information into a count identification model (e.g., count identification model 120 in FIG. 1) for detecting a delivery object count. The delivery object information may include geometrical locations (e.g., XY coordinates) about each detected delivery object in the image data. The geometrical locations can be measured from the image data based on the indication of delivery objects determined by the computer vision model. The delivery object information may also include a manifest that indicates a number of items associated with the delivery at the delivery location and additional information about the items of the delivery (e.g., dimensions, packaging type, etc.). So, the count identification model can receive the indication of the delivery objects and the information about the delivery objects to determine a number of delivery objects in the image data.

The process 200 may continue at block 216 by the user device 804 receiving a result indicating a count of delivery object(s). Since each delivery object in the indication of delivery objects is associated with a probability of being depicted in the image data, the result generated by the count identification model can include multiple counts, each associated with a likelihood that the image data includes the associated count of delivery objects based on the probabilities. For instance, the result may indicate a first likelihood that the image data includes a first count of delivery objects and a second likelihood that the image data includes a second count of delivery objects. As a particular example, the first count may be three delivery objects with a likelihood of 95% and the second count may be four objects with a likelihood of 45%. The second AI model may then select the count with the highest likelihood as the count of delivery objects in the image data. So, the count identification model can indicate that the count of delivery objects at the delivery location is three delivery objects.

The process 200 may continue at block 218 by the user device 804 determining whether the count matches the manifest. The user device 804 can compare the count of the result output by the count identification model to the number of items to be delivered at the delivery location to determine whether there is a match or mismatch between the count and the manifest. If there is a mismatch, the process 200 can proceed to block 212 where a notification of an incorrect delivery is output. The notification may indicate the mismatch and that additional image data is to be generated of the delivery location that includes each item that is to be delivered at the delivery location. If there is a match, the process 200 can proceed at block 220.

The process 200 may continue at block 220 by the user device 804 outputting a notification of a correct delivery. The notification may indicate that the shipping packaging is not detected and that the count matches the manifest. The notification can be presented in an overlay over the image data. In addition, the user device 804 may verify the delivery as correct and allow the delivery agent to complete processing of the delivery for the delivery location and proceed to a next delivery at another delivery location.

Figure 3:
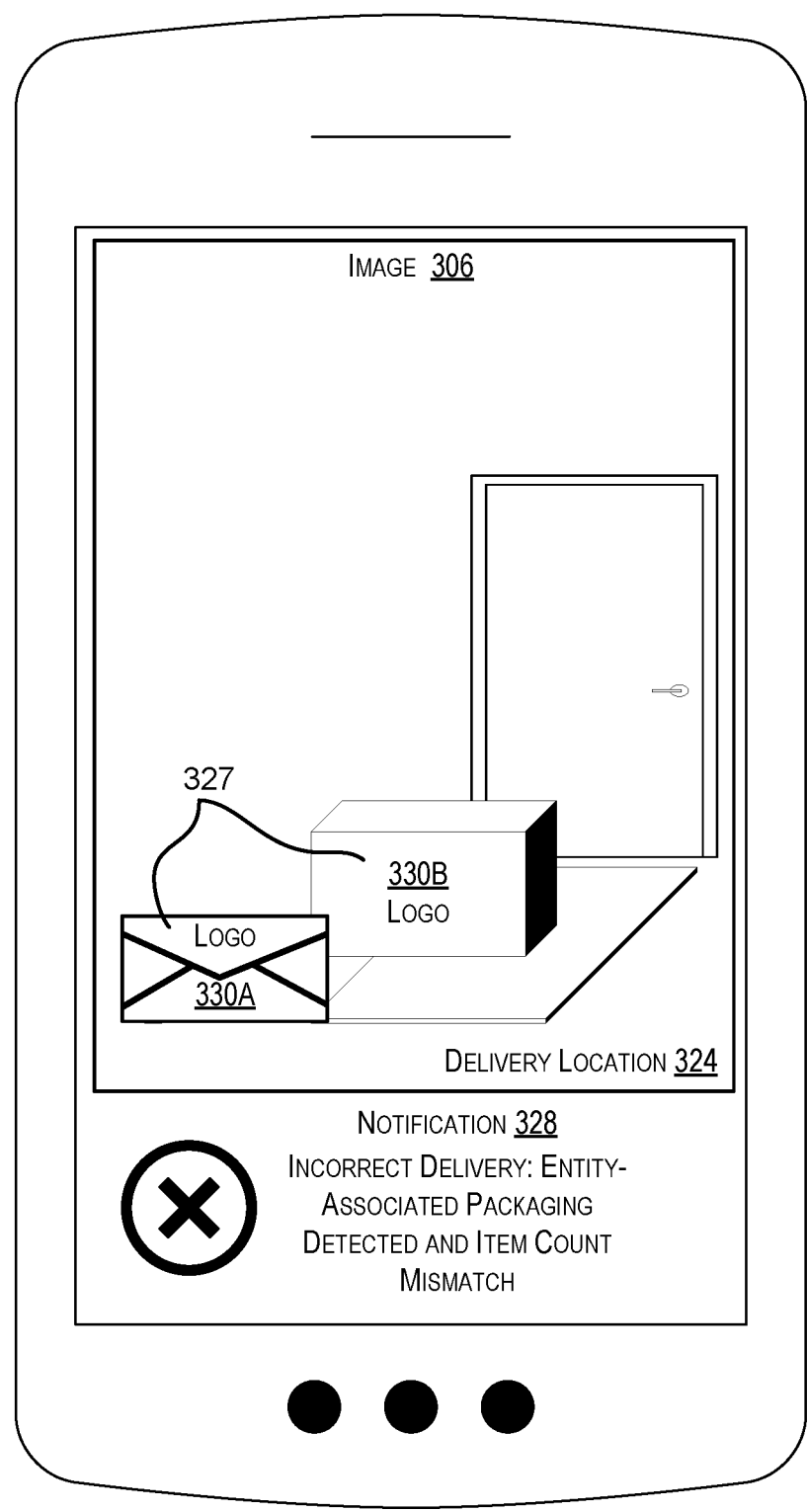
FIG. 3 illustrates an example of an image of an incorrect delivery, according to at least one example.

FIG. 3 illustrates an example of an image 306 of an incorrect delivery, according to at least one example. The image 306 is generated by a camera of a user device 804 and is displayed by the user device 804. The image 306 corresponds to a delivery of delivery objects 330A-B at a delivery location 324. The user device 804 can determine that the delivery location 324 is associated with a delivery-object action of a shipping packaging removal operation. Then, based on the image 306 and a computer vision model (e.g., computer vision model 108 in FIG. 1) that detects delivery objects and an AI model (e.g., packaging identification model 116 in FIG. 1) that detects shipping packaging, the user device 804 can determine that the delivery objects 330A-B in the image 306 are associated with shipping packaging 327 (e.g., based on detection of a logo of the entity). Another AI model (e.g., count identification model 120 in FIG. 1) that determines a count of delivery objects can also determine the count of delivery objects in the image 306. The user device 804 can compare the count to a manifest of items to be delivered at the delivery location 324 and determine that there is a mismatch between the count and the manifest. For example, the count can be determined to be two, but the manifest can indicate that three items are to be delivered at the delivery location 324. As a result, the user device 804 causes a presentation of a notification 328 indicating an incorrect delivery to be displayed at the user device 804. For instance, the notification 328 can be presented along with or overlaid over the image 306 (e.g., the notification 328 is displayed simultaneously along with the image 306). As illustrated, the notification 328 indicates that the shipping packaging 327 is detected and that an item count mismatch is detected.

Figure 4:
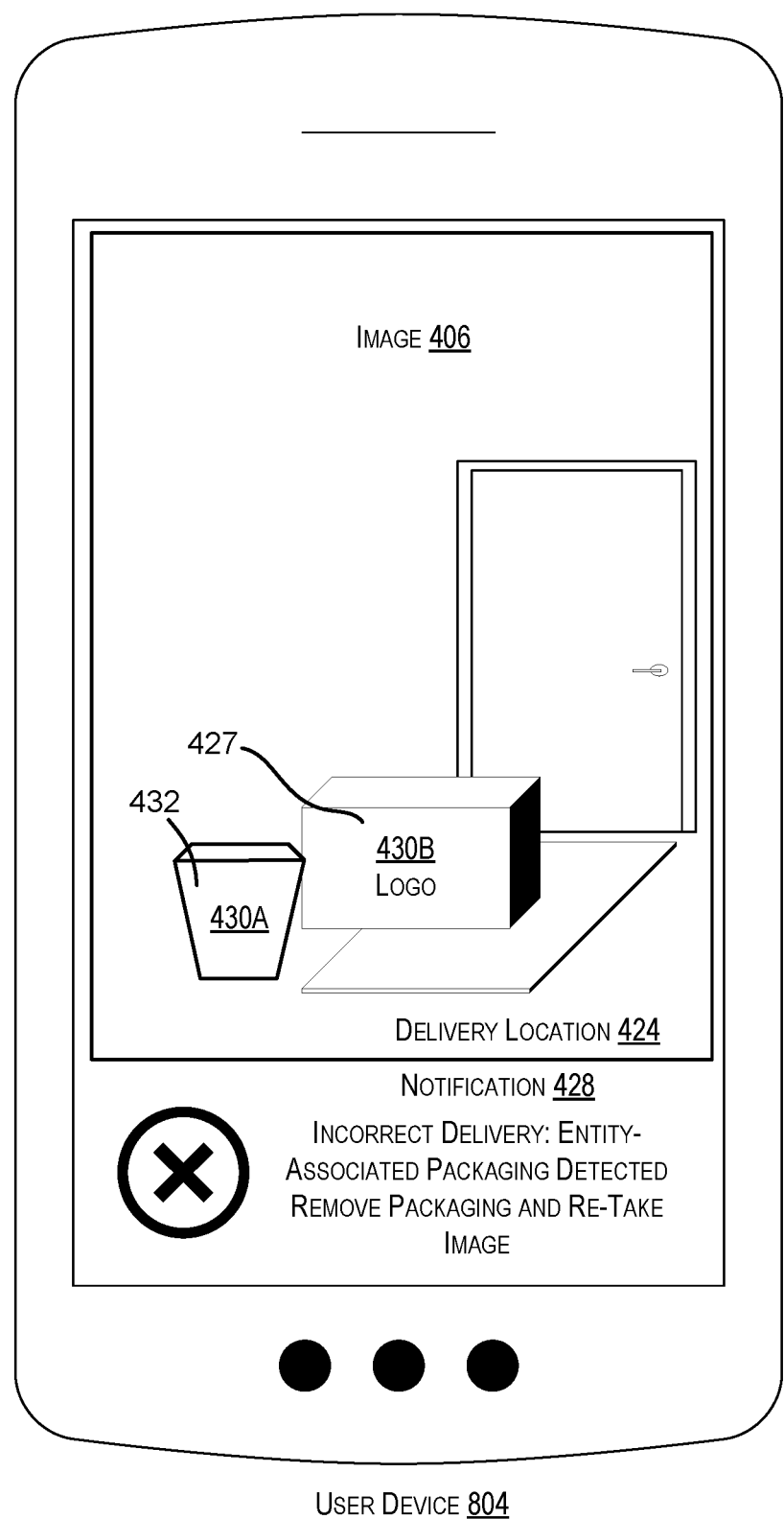
FIG. 4 illustrates another example of an image of an incorrect delivery, according to at least one example.

FIG. 4 illustrates another example of an image 406 of an incorrect delivery, according to at least one example. The image 406 is generated by a camera of a user device 804 and is displayed by the user device 804. The image 406 corresponds to a delivery of delivery objects 430A-B at a delivery location 424. The user device 804 can determine that the delivery location 424 is associated with a delivery-object action of a shipping packaging removal operation. Then, based on the image 406 and a computer vision model (e.g., computer vision model 108 in FIG. 1) that detects delivery objects and an AI model (e.g., packaging identification model 116 in FIG. 1) that detects shipping packaging, the user device 804 can determine that the delivery object 430B is associated with shipping packaging 427 (e.g., based on detection of a logo of the entity) and that the delivery object 430A is associated with non-shipping packaging 432. As a result, the user device 804 causes a presentation of a notification 428 indicating an incorrect delivery to be displayed at the user device 804. For instance, the notification 428 can be presented along with or overlaid over the image 406. As illustrated, the notification 428 is a text box presented on the display of the user device 804 outside a frame of the image 406 that indicates that the shipping packaging 427 is detected and that the shipping packaging 427 is to be removed and then additional image data of the delivery location 424 is to be generated. The notification 428 may alternatively be a text box presented over at least a portion of the frame of the image 406, a verbal notification output by a speaker of the user device 804, may include haptic feedback (e.g., vibration) provided by the user device 804, etc.

Figure 5:
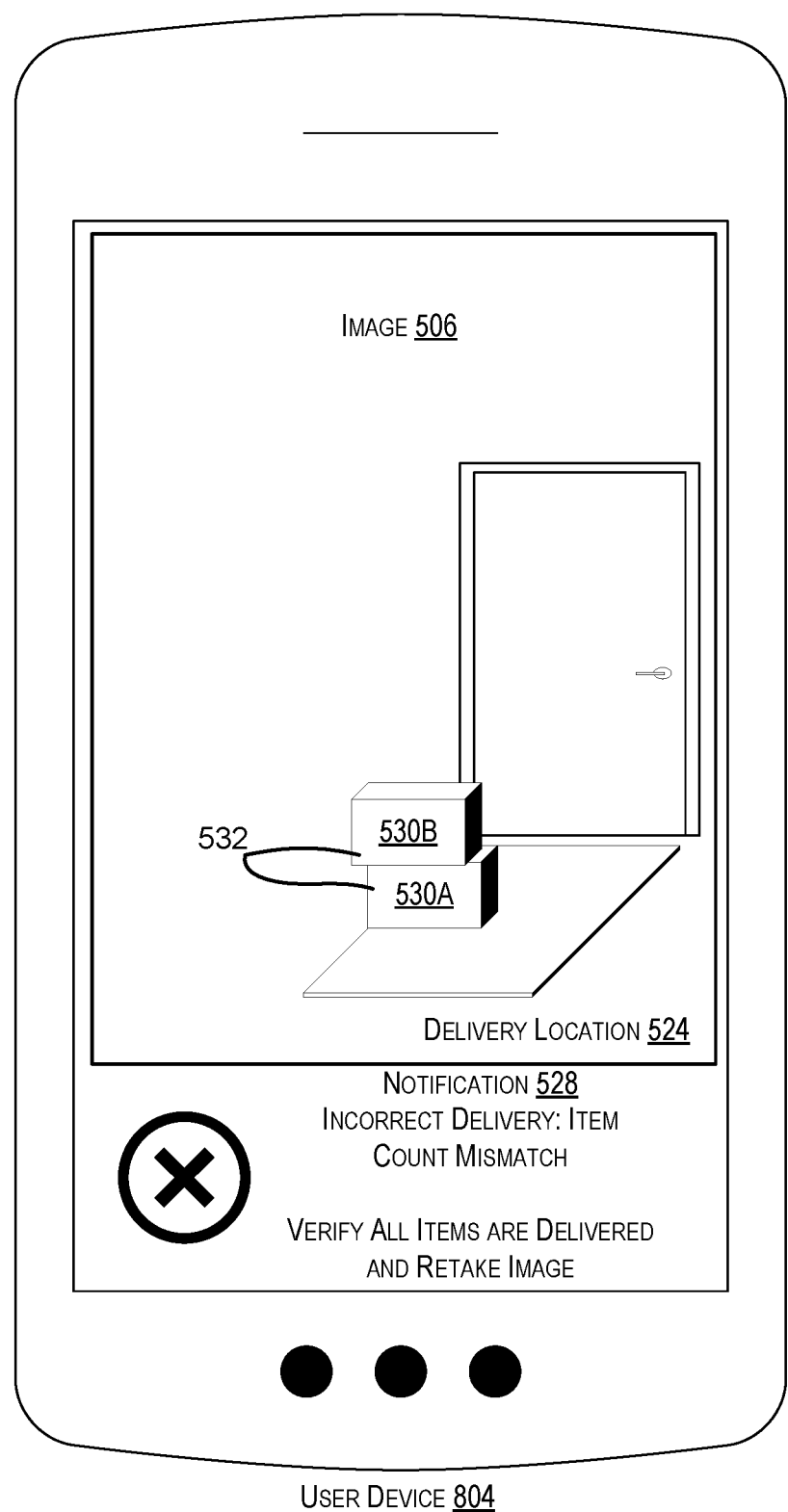
FIG. 5 illustrates an example of an image of an incorrect delivery, according to at least one example.

FIG. 5 illustrates an example of an image 506 of an incorrect delivery, according to at least one example. The image 506 is generated by a camera of a user device 804 and is displayed by the user device 804. The image 506 corresponds to a delivery of delivery objects 530A-B at a delivery location 524. The user device 804 can determine that the delivery location 524 is associated with a delivery-object action of a shipping packaging removal operation. Then, based on the image 506 and a computer vision model (e.g., computer vision model 108 in FIG. 1) that detects delivery objects and an AI model (e.g., packaging identification model 116 in FIG. 1) that detects shipping packaging, the user device 804 can determine that the delivery objects 530A-B in the image 506 are associated with non-shipping packaging 532. Another AI model (e.g., count identification model 120 in FIG. 1) that determines a count of delivery objects can then determine the count of delivery objects in the image 506. The user device 804 can compare the count to a manifest of items to be delivered at the delivery location 524 and determine that there is a mismatch between the count and the manifest. For example, the count can be determined to be two, but the manifest can indicate that three items are to be delivered at the delivery location 524. As a result, the user device 804 causes a presentation of a notification 528 indicating an incorrect delivery to be displayed at the user device 804. For instance, the notification 528 can be presented along with or overlaid over the image 506. As illustrated, the notification 528 indicates that an item count mismatch is detected and that a user is to verify all items are delivered and then generate updated image data of the delivery location 524.

Figure 6:
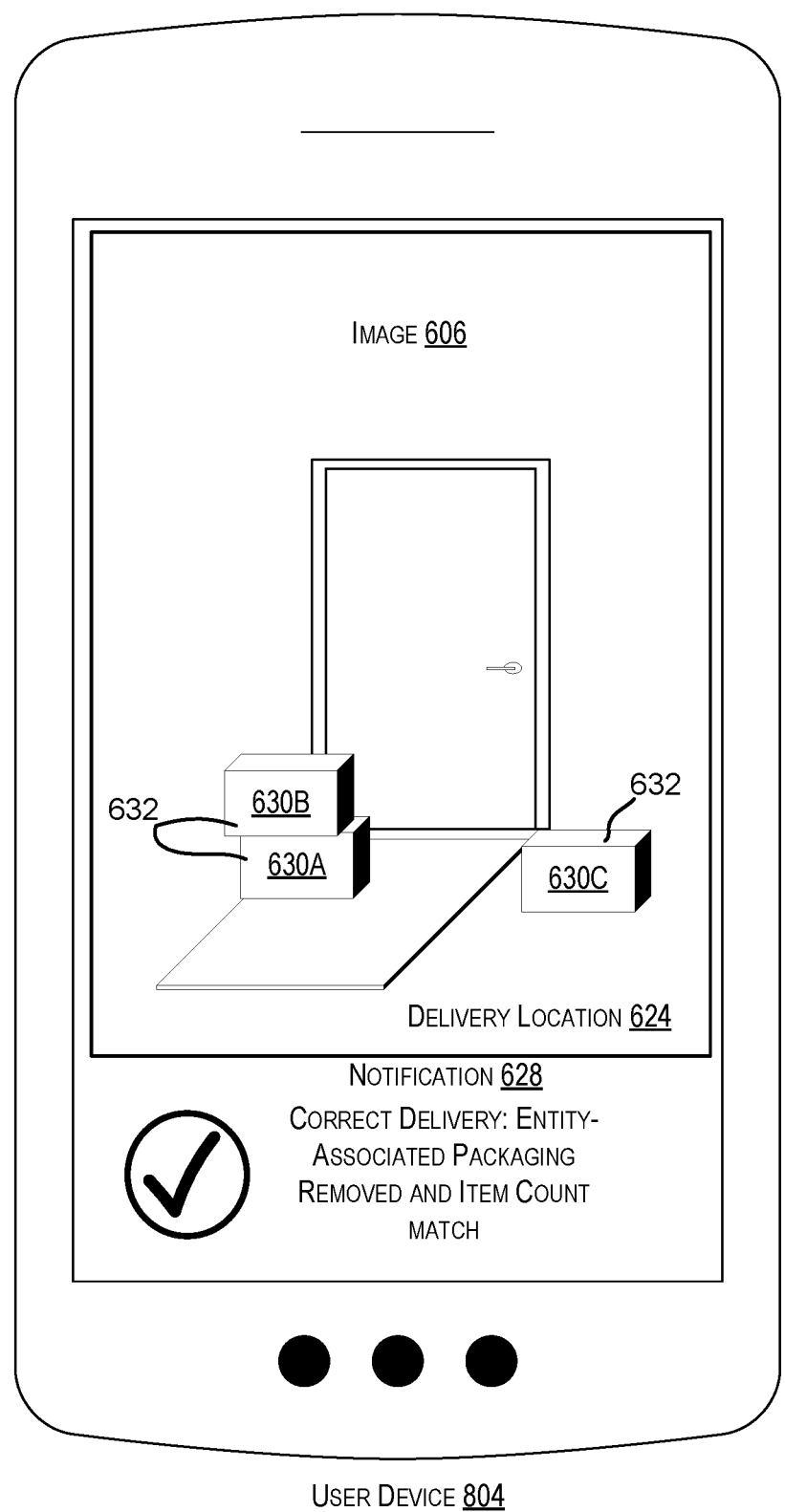
FIG. 6 illustrates an example of an image of a correct delivery, according to at least one example.

FIG. 6 illustrates an example of an image 606 of a correct delivery, according to at least one example. The image 606 is generated by a camera of a user device 804 and is displayed by the user device 804. The image 606 corresponds to a delivery of delivery objects 630A-C at a delivery location 624. The user device 804 can determine that the delivery location 624 is associated with a delivery-object action of a shipping packaging removal operation. Then, based on the image 606, a computer vision model (e.g., computer vision model 108 in FIG. 1) that detects delivery objects, and an AI model (e.g., packaging identification model 116 in FIG. 1) that detects shipping packaging, the user device 804 can determine that the delivery objects 630A-C in the image 606 are associated with non-shipping packaging 632. Another AI model (e.g., count identification model 120 in FIG. 1) that determines a count of delivery objects can then determine the count of delivery objects in the image 606. The user device 804 can compare the count to a manifest of items to be delivered at the delivery location 624 and determine that there is a match between the count and the manifest. For example, the count can be determined to be three and the manifest can indicate that three items are to be delivered at the delivery location 624. As a result, the user device 804 causes a presentation of a notification 628 indicating a correct delivery to be displayed at the user device 804. For instance, the notification 628 can be presented along with or overlaid over the image 606. As illustrated, the notification 628 indicates that shipping packaging is not detected an item count match is detected.

FIG. 7 illustrates an example flowchart showing a process for implementing techniques relating to verifying deliveries using artificial intelligence models, according to at least one example. The delivery verification engine 810 (FIG. 8) embodied in the computer system 802 (FIG. 8) and/or within the user device 804 (FIG. 8) may perform the process 700. Thus, while the description below is from the perspective of the user device 804, the computer system 802 may also perform the process 700 or portions of the process 700.

The process 700 may begin at block 702 by the user device 804 receiving image data 106 (FIG. 1) corresponding to a portion of a delivery location. The user device 804 can include a camera and a display. The user device 804 can generate, by the camera, the image data 106 corresponding to the portion of the delivery location. The image data can include one or more images of one or more portions of the delivery location or video data of the delivery location. The user device 804 can also generate, based at least in part on a depth sensor of the device, dimensional information of the portion of the delivery location. The user device 804 can determine, based on user account information associated with the delivery location, that the delivery location is associated with a delivery-object action and output a notification of the delivery-object action to at least one of a user associated with the user device 804 or the delivery verification engine 810 for determining correct deliveries and incorrect deliveries.

The process 700 may continue at block 704 by the user device 804 determining an indication of at least one delivery object in the portion. The image data 106 can be input into a computer vision model 108 (FIG. 1) trained for detecting delivery objects in images. The dimensional information may also be input into the computer vision model 108. The user device 804 can receive, from the computer vision model 108 based at least in part on the image data 106 (and the dimensional information), an indication of at least one delivery object 110 (FIG. 1) in the portion. The indication of the at least one delivery object 110 can include a list of the at least one delivery object and a probability of the image data 106 including the at least one delivery object for each delivery object of the at least one delivery object.

The process 700 may continue at block 706 by the user device 804 inputting the indication into a first AI model (e.g., packaging identification model 116 in FIG. 1) trained for detecting entity-associated packaging associated with the at least one delivery object. The first AI model can be trained based at least in part on at least one of: (i) images showing entity-associated packaging or (ii) additional images showing non-entity-associated packaging.

The process 700 may continue at block 708 by the user device 804 receiving, from the first AI model, an output of whether the at least one delivery object includes the entity-associated packaging. The output may indicate that the at least one delivery object is associated with the entity-associated packaging. Another output may alternatively indicate that the at least one delivery object is unassociated with the entity-associated packaging.

The process 700 may continue at block 710 by the user device 804 causing a presentation 126 (FIG. 1) about the output to be provided at the user device 804. The image data 106 and the presentation 126 in an overlay over the image data 106 can be presented on the display of the user device 804 and in real time relative to the image data 106 being generated. The presentation 126 can include a notification indicating that the entity-associated packaging is to be removed, an additional packaging is to be added, or other suitable action (e.g., changing how the deliver object is positioned, etc.). The notification can indicate an incorrect delivery based at least in part on the at least one delivery object being associated with the entity-associated packaging.

Alternatively, based at least in part on the output indicating the at least one delivery object is unassociated with the entity-associated packaging, the indication of the at least one delivery object in the portion and information associated with the at least one delivery object can be input into a second AI model (e.g., count identification model 120 in FIG. 1) trained for detecting counts of delivery objects. The information can include the manifest of items to be delivered at the delivery location. The user device 804 can receive, from the second AI model, a result indicating a count of the at least one delivery object in the portion, determine a mismatch between the count and the manifest of items to be delivered at the delivery location, and cause a presentation about the result to be provided at the user device 804 based at least in part on the mismatch. The result can indicate a first likelihood of the image data 106 including the count of the at least one delivery object and a second likelihood of the image data 106 including a second count of the at least one delivery object, and the first likelihood can be greater than the second likelihood. The presentation 126 can include a notification indicating additional image data is to be generated for the portion of the delivery location based at least in part on the mismatch. Alternatively, the user device 804 may receive, from the second AI model, another result indicating another count of the at least one delivery object in the portion, determine a match between the second count and the manifest of items to be delivered at the delivery location, and cause a presentation 126 about the other result to be provided at the user device 804 based at least in part on the match.

In some examples, the image data 106 may be first image data and after presenting the notification indicating the incorrect delivery, the user device 804 can generate second image data corresponding to the portion of the delivery location. The user device 804 can input the second image data into the first AI model, receive, from the first AI model based at least in part on the second image data, a second output indicating the at least one delivery object is unassociated with the entity-associated packaging, input the indication of the at least one delivery object in the portion and information associated with the at least one delivery object into the second AI model trained for detecting counts of delivery objects, and receive, from the second AI model, a result indicating a count of the at least one delivery object in the portion. The user device 804 can then determine a mismatch between the count and the manifest of items to be delivered at the delivery location and present, on the display, another notification indicating another incorrect delivery based at least in part on the mismatch.

Then, after presenting the other notification indicating the other incorrect delivery, the user device 804 can generate third image data showing the portion of the delivery location, input the third image data into the first AI model, and receive, from the first AI model based at least in part on the third image data, an output indicating the at least one delivery object is unassociated with the entity-associated packaging. The user device 804 can then input the indication of the at least one delivery object in the portion and the information associated with the at least one delivery object into the second AI model, receive, from the second AI model, a second result indicating a second count of the at least one delivery object in the portion, determine a match between the second count and the manifest of items to be delivered at the delivery location, and present, on the display, an additional notification indicating a correct delivery based at least in part on the match.

Figure 8:
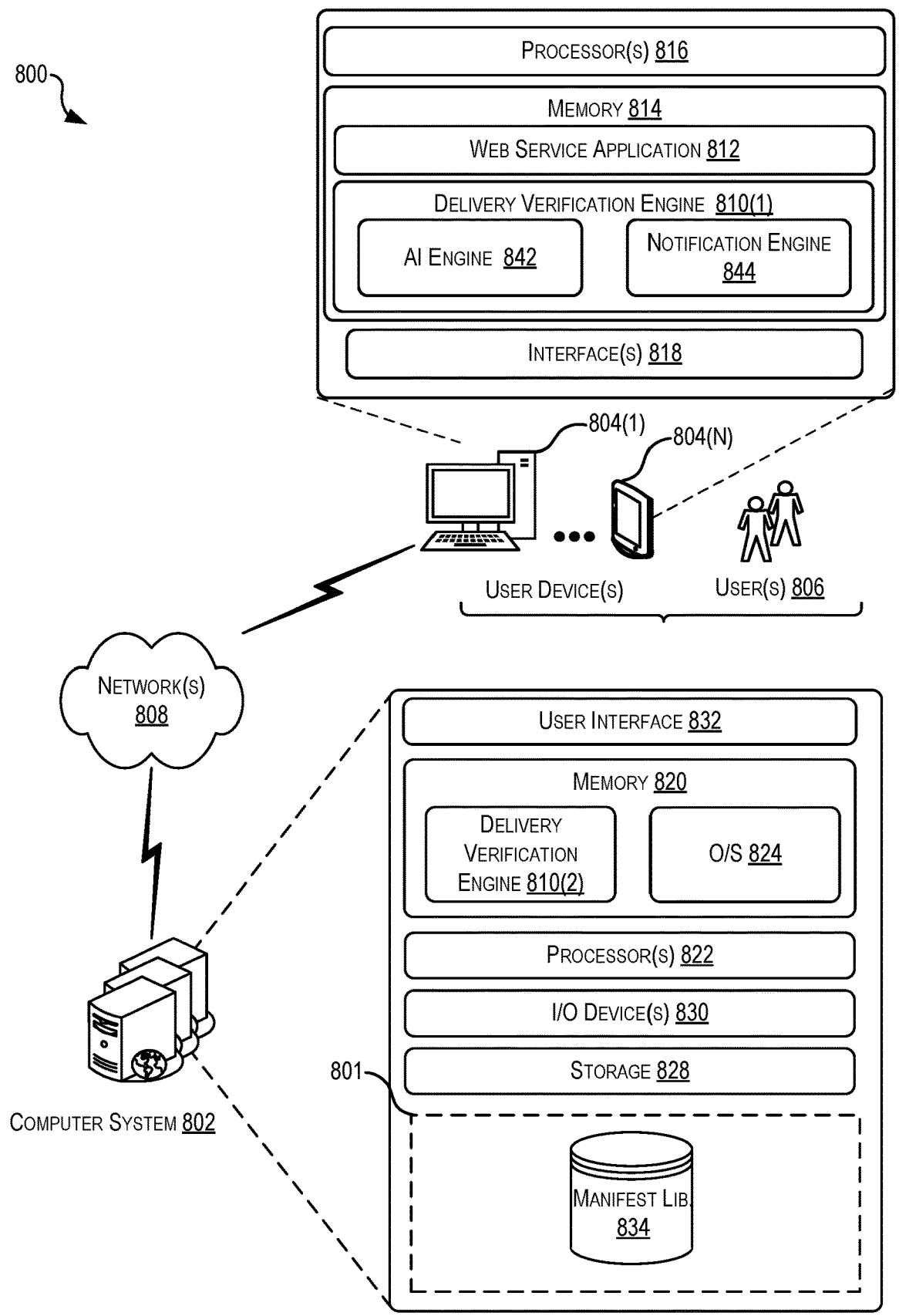
FIG. 8 illustrates an example schematic architecture for implementing techniques relating to verifying deliveries using artificial intelligence models, according to at least one example.

FIG. 8 illustrates an example schematic architecture 800 for implementing techniques relating to verifying deliveries using artificial intelligence models, according to at least one example. The architecture 800 may include a computer system 802 (e.g., the computer system described herein) in communication with one or more user devices 804(1)-804(N) via one or more networks 808 (hereinafter, "the network 808").

The user device 804 may be operable by one or more users 806 to interact with the computer system 802. The users 806 may be administrators, developers, or others that desire to test or utilize operations of the techniques described herein. The user device 804 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), a laptop computer, a desktop computer, a thin-client device, a tablet computer, etc. For example, the user device 804(1) is illustrated as a desktop computer, while the user device 804(N) is illustrated as an example of a handheld mobile device.

The user device 804 may include a memory 814 and processor(s) 816. In the memory 814 may be stored program instructions that are loadable and executable on the processor(s) 816, as well as data generated during the execution of these programs. Depending on the configuration and type of user device 804, the memory 814 may be volatile (such as random access memory ("RAM")) and/or non-volatile (such as read-only memory (ROM), flash memory, etc.).

In some examples, the memory 814 may include a web service application 812 and a version of a delivery verification engine 810 (e.g., 810(1)). The web service application 812 and/or the delivery verification engine 810(1) may allow the user 806 to interact with the computer system 802 via the network 808. The user device 804 may also include one or more interfaces 818 to enable communication with other devices, systems, and the like. The delivery verification engine 810, whether embodied in the user device 804 or the computer system 802, may be configured to perform the techniques described herein.

The delivery verification engine 810 includes an AI engine 842 and a notification engine 844. In an example, the delivery verification engine 810 can include any other suitable engines, modules, models, and the like.

The AI engine 842 can include one or more machine-learning (or artificial intelligence) models. In an example, the AI engine 842 may include one or more computer vision models (e.g., computer vision model 108 in FIG. 1), object classification models (e.g., packaging identification model 116 in FIG. 1), object detection models (e.g., count identification model 120 in FIG. 1), or other suitable amounts or types of machine-learning models. The AI engine 842 can manage various tasks related to the AI models. In an example, the AI engine 842 may train the AI models, may ingest data into the AI models, may transmit, or otherwise share output from the AI models, and any other suitable tasks. In an example, the AI engine 842 may be the AI models, may take the AI inputs, and may output the AI outputs relating to delivery verification. The AI models of the AI engine 842 may be configured to generate indications of delivery objects in image data, detect entity-associated packaging in image data, detect a count of delivery objects in image data, and/or perform other suitable machine-learning tasks with respect to the input image data described herein.

The notification engine 844 can include one or more computer services for causing a presentation of a notification based on the outputs generated by the AI engine 842. The notification engine 844 may receive outputs of the AI engine 842, may determine notifications associated with the outputs, may transmit, or otherwise share the notifications, and any other suitable tasks.

Turning now to the details of the computer system 802, the computer system 802 may include one or more computer system computers, perhaps arranged in a cluster of servers or as a server farm, and may host web service applications. The function of the computer system 802 may be implemented a cloud-based environment such that individual components of the computer system 802 are virtual resources in a distributed environment.

The computer system 802 may include at least one memory 820 and one or more processing units (or processor(s)) 822. The processor 822 may be implemented as appropriate in hardware, computer-executable instructions, software, firmware, or combinations thereof. Computer-executable instruction, software, or firmware implementations of the processor 822 may include computer-executable or machine-executable instructions written in any suitable programming language to perform the various functions described. The memory 820 may include more than one memory and may be distributed throughout the computer system 802. The memory 820 may store program instructions that are loadable and executable on the processor(s) 822, as well as data generated during the execution of these programs. Depending on the configuration and type of memory including the computer system 802, the memory 820 may be volatile (such as RAM and/or non-volatile (such as read-only memory ("ROM"), flash memory, or other memory)). The memory 820 may include an operating system 824 and one or more application programs, modules, or services for implementing the features disclosed herein including at least a version of the delivery verification engine 810 (e.g., 810(2)). For example, the delivery verification engine 810(2) may perform the functionality described herein.

The computer system 802 may also include additional storage 828, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 828, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 802 and/or part of the user device 804.

The computer system 802 may also include input/output (I/O) device(s) and/or ports 830, such as for enabling connection with a keyboard, a mouse, a pen, a voice input device, a touch input device, a display, speakers, a printer, or other I/O device.

In some examples, the computer system 802 may also include one or more user interface(s) 832. The user interface 832 may be utilized by an operator, curator, or other authorized user to access portions of the computer system 802. In some examples, the user interface 832 may include a graphical user interface, voice interfaces, web-based applications, programmatic interfaces such as APIs, or other user interface configurations.

The computer system 802 may also include a data store 801. In some examples, the data store 801 may include one or more databases, data structures, or the like for storing and/or retaining information associated with the computer system 802 and which, in some examples, may be accessible by the user devices 804. The delivery verification engine 810 is communicatively coupled (e.g., via a wired connection or a wireless connection) to the data store 801. The data store 801 includes a manifest library 834. In an example, the data store 801 can include any other suitable data, databases, libraries, and the like.

Figure 9:
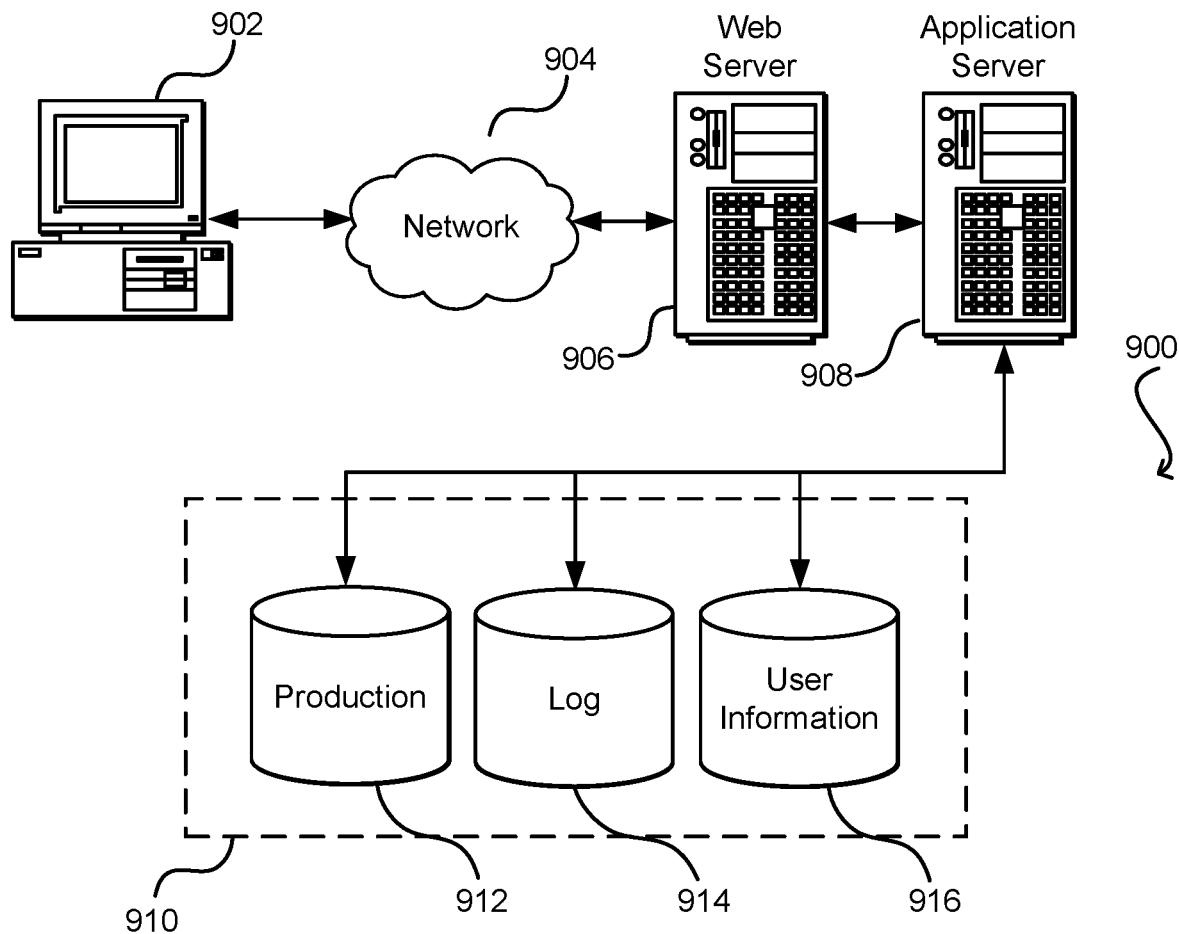
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A device comprising:
   a camera;
   a display;
   one or more processors; and
   one or more memories storing computer-readable instructions that, upon execution by the one or more processors, configure the device to:
      receive image data corresponding to a portion of a delivery location;
      determine an indication of at least one delivery object in the portion, wherein the at least one delivery object comprises at least one item being delivered at the delivery location;
      input the indication into a first model trained for detecting entity-associated packaging associated with the at least one delivery object, wherein the first model is an extreme gradient boosting model being run on the device, and wherein the entity-associated packaging comprises at least one indicator of shipping packaging including (i) an entity logo or (ii) a marking associated with the shipping packaging;
      receive, from the first model, an output of whether the at least one delivery object includes the entity-associated packaging;
      cause a first presentation about the output to be provided at the device, wherein the first presentation simultaneously includes the image data and a text box indicating the output;
      input, based at least in part on the output indicating the at least one delivery object is unassociated with the entity-associated packaging, the indication of the at least one delivery object in the portion and information associated with the at least one delivery object into a second model trained for detecting counts of delivery objects;
      receive, from the second model, a result indicating a count of the at least one delivery object in the portion;
      determine whether there is a match between the count and a manifest of items to be delivered at the delivery location; and
      cause a second presentation about the result to be provided at the device based at least in part on whether there is the match.

2. The device of claim 1, wherein the one or more memories store additional computer-readable instructions that, upon execution by the one or more processors, further configure the device to determine whether there is the match between the count and the manifest by:
   determining a mismatch between the count and the manifest of items to be delivered at the delivery location; and
   causing the second presentation about the result to be provided at the device based at least in part on the mismatch, wherein the second presentation indicates an incorrect delivery.

3. The device of claim 1, wherein the one or more memories store additional computer-readable instructions that, upon execution by the one or more processors, further configure the device to determine whether there is the match between the count and the manifest by:

determining the match between the count and the manifest of items to be delivered at the delivery location; and causing the second presentation about the result to be provided at the device based at least in part on the match, wherein the second presentation indicates a correct delivery.

4. The device of claim 1, wherein the one or more memories store additional computer-readable instructions that, upon execution by the one or more processors, further configure the device to:

prior to determining the indication of the at least one delivery object in the portion:

determine, based on user account information associated with the delivery location, that the delivery location is associated with a delivery-object action; and output a notification of the delivery-object action to at least one of: (i) a user associated with the device or (ii) a delivery verification engine for determining correct deliveries and incorrect deliveries.

5. A method implemented on a computer system, the method comprising:

receiving image data corresponding to a portion of a delivery location;

determining an indication of at least one delivery object in the portion, wherein the at least one delivery object comprises at least one item being delivered at the delivery location;

inputting the indication into a first model trained for detecting entity-associated packaging associated with the at least one delivery object, wherein the first model is an extreme gradient boosting model being run on a device, and wherein the entity-associated packaging comprises at least one indicator of shipping packaging including (i) an entity logo or (ii) a marking associated with the shipping packaging;

receiving, from the first model, an output of whether the at least one delivery object includes the entity-associated packaging;

causing a first presentation about the output to be provided at the device, wherein the first presentation simultaneously includes the image data and a text box indicating the output;

inputting, based at least in part on the output indicating the at least one delivery object is unassociated with the entity-associated packaging, the indication of the at least one delivery object in the portion and information associated with the at least one delivery object into a second model trained for detecting counts of delivery objects;

receiving, from the second model, a result indicating a count of the at least one delivery object in the portion;

determining, whether there is a match between the count and a manifest of items to be delivered at the delivery location; and causing a second presentation about the result to be provided at the device based at least in part on whether there is the match.

6. The method of claim 5, wherein the computer system comprises the device, and further comprising:

generating, based at least in part on a camera of the device, the image data; and presenting, on a display of the device and in real time relative to the image data being generated, the image data and the first presentation in an overlay over the image data.

7. The method of claim 5, wherein determining the indication comprises:

inputting the image data into a computer vision model trained for detecting delivery objects in images; and receiving, from the computer vision model based at least in part on the image data, the indication of the at least one delivery object in the portion.

8. The method of claim 5, wherein the first model is trained based at least in part on at least one of: (i) images showing entity-associated packaging or (ii) additional images showing non-entity-associated packaging.

9. The method of claim 8, wherein the indication of the at least one delivery object comprises a list of the at least one delivery object and a probability of the image data including the at least one delivery object for each delivery object of the at least one delivery object.

10. The method of claim 5, wherein determining whether there is the match between the count and the manifest comprises:

determining a mismatch between the count and the manifest of items to be delivered at the delivery location; and causing the second presentation about the result to be provided at the device based at least in part on the mismatch, wherein the second presentation indicates an incorrect delivery.

11. The method of claim 10, wherein the information comprises the manifest of items to be delivered at the delivery location and the result indicates a first likelihood of the image data including the count of the at least one delivery object and a second likelihood of the image data including a second count of the at least one delivery object, wherein the first likelihood is greater than the second likelihood.

12. The method of claim 5, wherein the output indicates the at least one delivery object is associated with the entity-associated packaging, and the method further comprising:

causing the first presentation about the output to be provided at the device, wherein the first presentation includes a notification indicating that the entity-associated packaging is to be removed.

13. The method of claim 5, wherein determining whether there is the match between the count and the manifest comprises:

determining the match between the count and the manifest of items to be delivered at the delivery location; and causing the second presentation about the result to be provided at the device based at least in part on the match, wherein the second presentation indicates an incorrect delivery.

14. A computer system comprising:

one or more processors; and one or more memories storing computer-readable instructions that, upon execution by the one or more processors, configure the computer system to:

receive image data corresponding to a portion of a delivery location;

determine an indication of at least one delivery object in the portion, wherein the at least one delivery object comprises at least one item being delivered at the delivery location;

input the indication into a first model trained for detecting entity-associated packaging associated with the at least one delivery object, wherein the first model is an extreme gradient boosting model being run on a device, and wherein the entity-associated packaging comprises at least one indicator of shipping packaging including (i) an entity logo or (ii) a marking associated with the shipping packaging;

receive, from the first model, an output of whether the at least one delivery object includes the entity-associated packaging;

cause a first presentation about the output to be provided at the device, wherein the first presentation simultaneously includes the image data and a text box indicating the output;

input, based at least in part on the output indicating the at least one delivery object is unassociated with the entity-associated packaging, the indication of the at least one delivery object in the portion and information associated with the at least one delivery object into a second model trained for detecting counts of delivery objects;

receive, from the second model, a result indicating a count of the at least one delivery object in the portion;

determine whether there is a match between the count and a manifest of items to be delivered at the delivery location; and cause a second presentation about the result to be provided at the device based at least in part on whether there is the match.

15. The computer system of claim 14, wherein the one or more memories store additional computer-readable instructions that, upon execution by the one or more processors, further configure the computer system to:

generate, based at least in part on a camera of the device, the image data; and generate, based at least in part on a depth sensor of the device, dimensional information of the portion of the delivery location.

16. The computer system of claim 15, wherein determining the indication comprises:

inputting the image data and the dimensional information into a computer vision model trained for detecting delivery objects in images; and receiving, from the computer vision model based at least in part on the image data and the dimensional information, the indication of the at least one delivery object in the portion.

17. The computer system of claim 14, wherein the first presentation comprises a notification indicating the entity-associated packaging is to be removed or an additional packaging is to be added.

18. The computer system of claim 14, wherein the one or more memories store additional computer-readable instructions that, upon execution by the one or more processors, further configure the computer system to determine whether there is the match between the court and the manifest by:

determining a mismatch between the count and the manifest of items to be delivered at the delivery location; and causing the second presentation about the result to be provided at the device based at least in part on the mismatch, wherein the second presentation indicates an incorrect delivery.

19. The computer system of claim 18, wherein the second presentation comprises a notification indicating additional image data is to be generated for the portion of the delivery location based at least in part on the mismatch.

20. The computer system of claim 14, wherein the image data comprises one or more images of one or more portions of the delivery location or video data of the delivery location.

* * * * *